United States Patent [19]

Yatcilla et al.

[11] 4,196,661
[45] Apr. 8, 1980

[54] KNOTTING MONITOR FOR CROP BALERS

[75] Inventors: George Yatcilla, Newton; William C. Peterson, Hesston, both of Kans.

[73] Assignee: Hesston Corporation, Hesston, Kans.

[21] Appl. No.: 963,280

[22] Filed: Nov. 24, 1978

[51] Int. Cl.² .............................................. B65B 13/18
[52] U.S. Cl. ........................................ 100/4; 100/99; 116/282; 200/61.18; 340/677
[58] Field of Search ...................... 100/4, 99; 116/281, 116/282; 200/61.18; 242/57; 340/675, 677

[56] References Cited

U.S. PATENT DOCUMENTS

| | | | |
|---|---|---|---|
| 2,624,791 | 1/1953 | Krow | 100/99 X |
| 2,640,893 | 6/1953 | Stalzer | 100/99 X |
| 2,712,042 | 6/1955 | Nolt | 200/61.18 |
| 2,713,621 | 7/1955 | Hoffman | 100/99 X |
| 2,824,184 | 2/1958 | Mandleco | 100/99 X |
| 3,513,464 | 5/1970 | Yarbro | 100/99 X |
| 3,850,122 | 11/1974 | Daeli | 200/61.18 |

Primary Examiner—Billy J. Wilhite
Attorney, Agent, or Firm—Schmidt, Johnson, Hovey & Williams

[57] ABSTRACT

The knotting mechanism of a crop baler has a spring-loaded arm normally pulled down to a lowered position by the binding twine during operation of the knotter. However, if the knotter accidentally fails to tie a knot or the twine otherwise slips loose, the resulting slack will allow the arm to swing upwardly, and this motion may be used to trigger a switch for setting off an alarm or to raise a signal flag, either of which would indicate that the knotter needs attention.

4 Claims, 2 Drawing Figures

KNOTTING MONITOR FOR CROP BALERS

TECHNICAL FIELD

This invention relates to crop balers and, more particularly, to knotting mechanisms associated with such balers.

BACKGROUND ART

Although in many respects the present invention has utility in connection with so-called "single knotters" in which a crop bale is enveloped by a binding loop having but one knot joining opposite ends of the loop, the present invention has particular utility for use in connection with a "double knotter" by virtue of which each binding loop around the bale consists of two separate strands of material joined together at two locations to form two knots at such locations.

An example of such a double knotter may be found in U.S. Pat. No. 4,074,623 issued Feb. 21, 1978 in the name of Allen A. White and assigned to the assignee of the present invention. Said patent is hereby incorporated by reference into the present specification as may be necessary for a full and complete understanding of the present invention.

A problem with present-day knotters lies in the fact that, due to a variety of causes, the knotters may from time-to-time "miss" and fail to form a knot as intended. Thus, the bale loses a degree of its structural integrity, depending upon how many of the side-by-side strands around the bale have failed to be knotted. At worst, this results in the bale completely falling apart as it issues from the baler and hits the ground, causing a substantial waste of time, effort and money.

The problem is compounded by the fact that the operator is normally positioned well ahead of the location on the baler where knotting takes place and his view to the knotter is obstructed. Furthermore, in "extrusion" balers where the bales issue from a restricted orifice at the rearend of the baler, once a bale has been tied by the knotter, it normally remains in the bale chamber, although incrementally issuing through the orifice, at least until such time as the next bale has been fully formed so as to provide a backstop for compaction purposes of the next bale. Thus, the fact that the knotter has mistied may not become evident until two or more defectively tied bales have been produced and the first of those has hit the ground.

SUMMARY OF THE PRESENT INVENTION

Accordingly, one important object of the present invention is to provide a way of monitoring the knotting operation and signaling the operator if the knotter fails to complete a tie and the binding strand associated therewith slips into a slack condition.

Pursuant to this object, the present invention as herein set forth utilizes a spring-loaded arm about which a binding strand normally remains looped throughout formation of the bales and the knotting cycles. Tension on the strand normally maintains the spring-loaded arm downwardly into a lowered position against the force of its return spring, but when the strand accidentally slips out of the knotter during a mistie, or when the strand otherwise becomes abnormally slack such as if the knot should itself pull free before the bale has been completely finished, at that point in time the strand will allow the arm to swing abruptly upwardly. Such upward movement of the arm may, in one embodiment of the invention, trigger a signal device in the nature of a switch that in turn sets off an alarm buzzer, signal light or the like. In another embodiment the upward movement may cause a signal device to be displaced upwardly into a visually perceivable position so that the operator can immediately stop the baler and make such adjustments to the knotter as may be necessary to overcome the problem.

DETAILED DESCRIPTION

Figure 1:
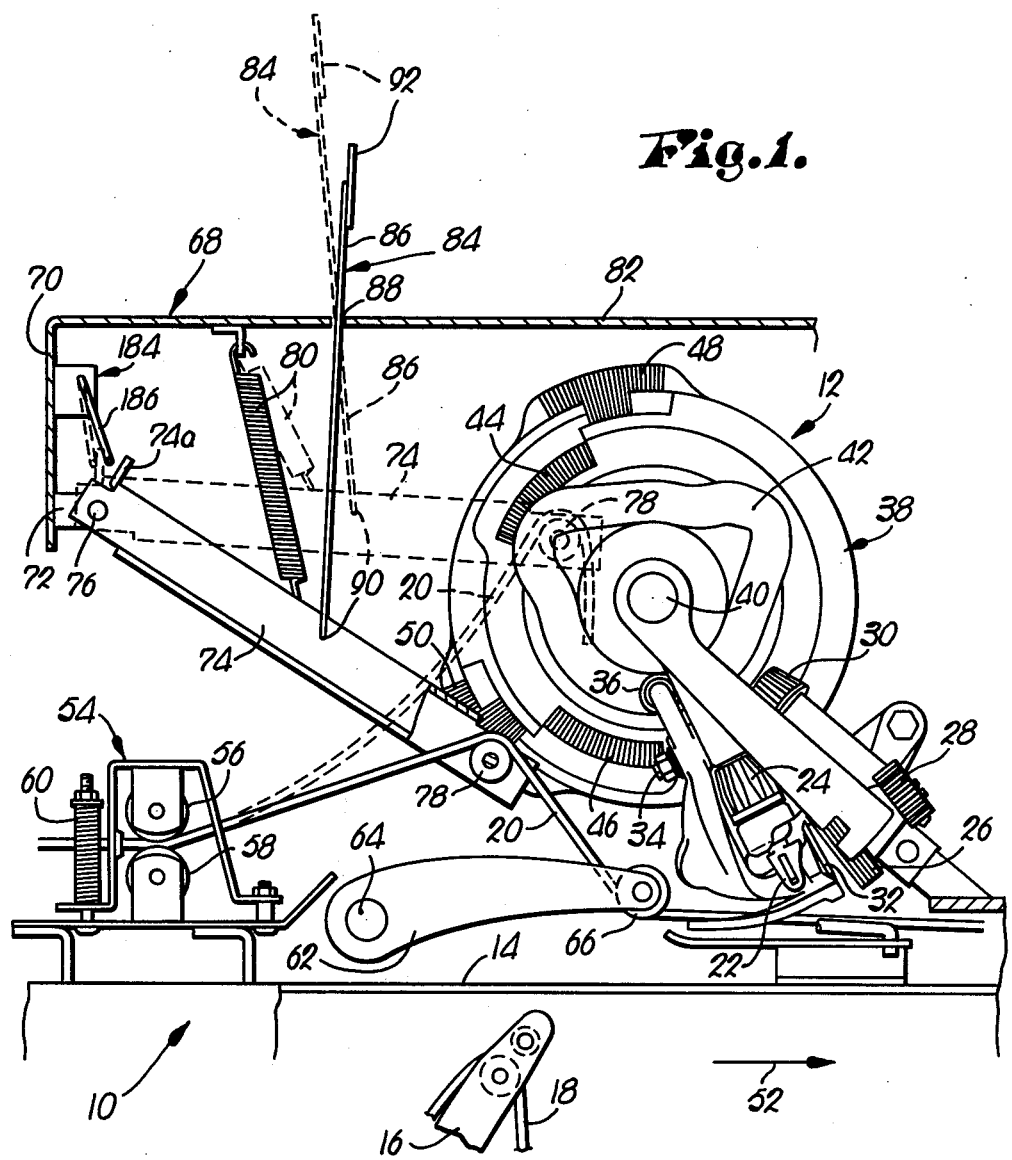
FIG. 1 is a side elevational view of a baler and knotting mechanism associated therewith, together with two forms of a knotting monitor constructed in accordance with the principles of the present invention, the phantom lines indicating the position of components upon a malfunction of the knotter, and parts being broken away and shown in cross section for clarity.

FIG. 1 shows a bale case 10 forming part of a baler that is operable to produce compacted crop bales and to discharge the same upon completion of said production. A knotter 12 is located along the top wall 14 of the bale case 10 and may comprise one of several such knotters depending upon the size of the bale and the number of strands to be wrapped around such bale in side-by-side relationship. In connection with the knotter 12, a needle 16 is operable to swing across the bale case 10 upon completion of the compacting and forming cycle of a bale so as to present one strand 18 of binding material from one source of such material to the knotter 12 along with a second strand 20 of binding material from a second source.

The knotter 12 further includes a bill hook 22 designed to rotate about a generally upright axis during the knotting cycle, a gear 24 coupled with the bill hook 22 for rotating the latter upon rotation of the gear 24, a holder 26 driven by gears 28 and 30 for retaining the strands 18 and 20 in position during a certain portion of the knotting cycle, and a knife 32 mounted for swinging transversely of the strands about a pivot 34 so as to remove completed knots from the bill hook 22 and sever the same from the sources of strand supply at the end of each knotting operation. A cam follower 36 is located on the opposite side of the pivot 34 from the knife 32 for effecting said swinging movement of the knife 32 in response to rotation of a driving disc 38 fixed to a transverse shaft 40 for rotation therewith.

In addition to a cam track 42 on the disc 38 for operating the knife 32, the disc 38 also includes a pair of circumferentially spaced apart gear sections 44 and 46 which sequentially mesh with the gear 30 at spaced intervals during rotation of the disc 38 so as to operate the holder 26, and a pair of peripherally outermost, circumferentially spaced apart gear segments 48 and 50 that sequentially mesh with the gear 24 of bill hook 22 at spaced intervals during rotation of the disc 38 so as to drive the bill hook 22.

Further details of the knotter 12 and its specific manner of operation may be obtained by reference to U.S. Pat. No. 4,074,623. Suffice it to point out herein that the bales move rearwardly through the bale case 10 in the direction of the arrow 52 during formation, and after a bale has reached the desired length, the knotter 12 is activated as the needle 16 swings upwardly across the bale case 10 to present the strand 18 to the knotter 12 and to engage the strand 20 during such movement so as to likewise present the strand 20 to the knotter 12. Rotation of the bill hook 22 forms the knot while the strands 18 and 20 are retained by the knotter 12.

Each loop of binding material around a bale is formed by two different strands of material, i.e., the strand 18 and strand 20. The strand 18 extends along the rear face of the bale, along the bottom of the bale, and along the front face of the bale, while the strand 20 extends along the top surface of the bale to complete the rectangular loop. The strands 18 and 20 are joined together in two knots located at the upper front and rear corners of the bale, and in order to complete such two knots, the knotter 12 operates through two successive operating cycles each time the needle 16 swings up into the vicinity of the knotter 12. Thus, during each actuation of the needle 16, the knotter 12 makes the final knot on the bale that has just been formed, and then makes the first knot for the next bale (which has not yet started formation). This accounts for the fact that the disc 38 includes two of the gear sections 44, 46 and two of the gear segments 48, 50.

As depicted in FIG. 1, the knotter 12 is about to start its knotting cycle and make the final knot on a fully formed bale located to the right of the strand 18 as viewed in FIG. 1. Hence, the upper strand 20 is shown as leading rearwardly beyond the knotter 12 toward the rear, discharge end of the bale case 10. Tension is maintained in the strand 20 by virtue of a tensioning device 54 which includes a pair of opposed, normally peripherally ribbed rollers 56 and 58 yieldably biased toward one another by a spring 60 so as to clamp the strand 20 therebetween. A lever 62 extending generally in a fore-and-aft direction as viewed in FIG. 1 has one end thereof fixed to a shaft 64 and the other end provided with a roller 66 engaging the top surface of the strand 20 such that the latter is looped slightly under the roller 66. The shaft 64 is operated by mechanism not shown so as to oscillate the lever 62 through a limited vertical path of travel during the knotting cycle so as to assist in proper location of the strand 20 with respect to the bill hook 22 and the holder 26.

A housing 68 overlies the knotter 12 and has a downwardly extending, forwardly disposed wall 70 that supports a rearwardly extending lug 72. The lug 72 in turn supports a rearwardly extending arm 74 for vertical swinging movement about a transverse pivot 76 between the two alternate positions illustrated in FIG. 1. Adjacent its outer end, the arm 74 carries a roller 78 over which the strand 20 is looped ahead of being trained under the roller 66 associated with the lever 62. A tension spring 80 connected between the arm 74 and the upper wall 82 of the housing 68 yieldably biases the arm 74 toward an upper, released position indicated by phantom lines in FIG. 1. Normally, the tension on the strand 20 from a forming bale as its moves in the direction of the arrow 52, or the tension maintained by the knotter 12 when the strand 18 and 20 are held by the holder 26, maintains the arm 74 in its lower, solid-line position of FIG. 1.

A signal device 84 is operably coupled with the arm 74 for displacement by the latter to a warning position upon movement of the arm 74 to its upper, released position. The signal device 84 includes a generally upright rod 86 that extends through a vertical opening 88 in the top wall 82 and has a pivotal connection 90 at its lowermost end with the arm 74. At its upper end, the rod 86 carries a visually perceivable element which may be in the nature of a reflectice disc 92.

Figure 2:
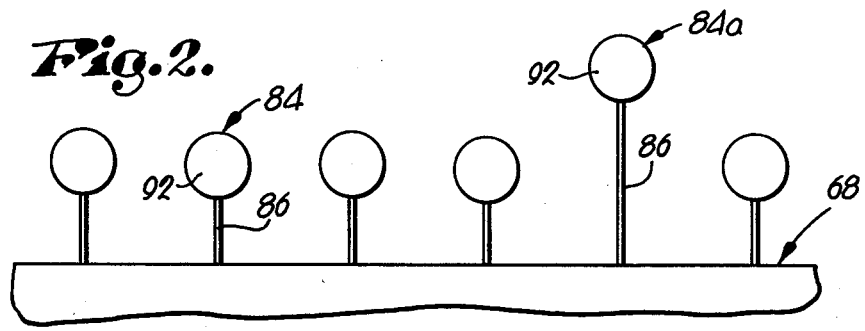
FIG. 2 is a fragmentary, elevational view of the baler rotated ninety degrees from FIG. 1 and showing a series of one form of signal devices with one of the same raised to a warning position.

FIG. 2 illustrates that there may be a number of signal devices 84 used in connection with the baler depending upon the number of knotters 12 involved. In the particular illustrated embodiment, six knots 12 are contemplated, and thus six signal devices 84 are illustrated, each functioning in the same manner as the signal device 84 shown in FIG. 1.

As above mentioned, so long as the knotter 12 is performing properly, a sufficient amount of tension will be maintained in the strand 20 to keep the arm 74 pulled down against the bias of spring 80 so that the signal device 84 is maintained in its lowered position as illustrated in solid lines in FIG. 1 and by five of the six signal devices in FIG. 2. The operator, situated on the tractor seat well ahead of the knotters 12, can periodically look to the rear and check to see if all of the signal devices 84 are lowered, indicating normal operation.

However, if any one of the knotters 12 should "miss" during a knotting cycle so as to accidentally release the strands 18 and 20, the tension in the strand 20 will immediately be lost, and the slack condition thus generated will allow the spring 80 of the affected arm 74 to pull such arm 74 upwardly to the phantom position of FIG. 1, thereby raising the signal device 84 to the upper warning position as indicated by phantom lines in FIG. 1 and by the signal device 84a in FIG. 2. This permits the operator to immediately cease operations and attend to the malfunctioned knotter 12.

Note that as an arm 74 swings about its pivot 76, it likewise tends to move its signal device 84 in an arcuate path of travel. However, due to the fact that the rod 86 of each signal device 84 is pivoted to its arm 74 at pivotal connection 90, such arcuate movement of the arm 74 is accommodated and the rod 86 slides through the vertical opening 88 without undue resistance.

FIG. 1 also shows an alternative form of signal device 184 that, like device 84, is actuated by the arm 74 moving upwardly to its released position. Device 184 is in the nature of an electrical switch having a lever 186 or other actuating member positioned to be depressed by a lug 74a on the arm 74 when the latter swings upwardly. Such depression of lever 186 causes switch 184 to close an electrical circuit that energizes a warning buzzer, signal light or the like (not shown) at the operation station so as to indicate a malfunction. Normally, only one or the other of the signal devices 84 and 184 will be used although for convenience, both forms are illustrated conjointly in FIG. 1.

We claim:

1. In a crop baler having mechanism for binding bales produced in the baler with strands of binding material, said mechanism including a yieldably biased arm engaged with a strand and normally held by the latter against movement by said yieldable bias to a released position during the binding operation, the combination with said mechanism of means for monitoring said operation to indicate an abnormal, slack condition in said strand, said means comprising:

a signal device disposed for actuation by said arm upon said movement of the arm to said released position, said signal device being operably coupled with said arm for displacement by the latter to a warning position upon said movement of the arm to said released position, said signal device including a rod connected at one end to said arm and having a visually perceivable element at the opposite end thereof.

2. In a crop baler as claimed in claim 1; and stationary guide means slidably receiving said rod intermediate said ends for confining said signal device to a predetermined path of travel during said displacement thereof.

3. In a crop baler as claimed in claim 2, wherein said arm is mounted for swinging movement, said connection of the rod with the arm being pivotal in nature so as to accommodate said sliding of the rod through said guide means.

4. In a crop baler as claimed in claim 3, wherein said element comprises a reflector.

* * * * *